United States Patent
Ramachandra et al.

(10) Patent No.: US 10,902,742 B2
(45) Date of Patent: Jan. 26, 2021

(54) METHOD AND DEVICE FOR EVALUATING DRIVING BEHAVIOR

(71) Applicant: FORD MOTOR COMPANY, Dearborn, MI (US)

(72) Inventors: Meghashree Kowshika Ramachandra, Aachen (DE); Andreas Ortseifen, Eschweiler (DE); Yuliya Aksyutina, Nordrhein-Westfalen (DE); Julian David Pott, Aachen (DE)

(73) Assignee: Ford Motor Company, Dearborn, MI (US)

( * ) Notice: Subject to any disclaimer, the term of this patent is extended or adjusted under 35 U.S.C. 154(b) by 277 days.

(21) Appl. No.: 15/837,758

(22) Filed: Dec. 11, 2017

(65) Prior Publication Data

US 2018/0197440 A1   Jul. 12, 2018

(30) Foreign Application Priority Data

Jan. 9, 2017   (DE) .................. 10 2017 200 149

(51) Int. Cl.
  *G09B 5/02*   (2006.01)
  *G09B 19/16*   (2006.01)
  (Continued)

(52) U.S. Cl.
  CPC .......... *G09B 19/167* (2013.01); *B60K 35/00* (2013.01); *B60W 30/00* (2013.01); *G05D 1/0061* (2013.01);
  (Continued)

(58) Field of Classification Search
  CPC .................................................. G09B 19/167
  (Continued)

(56) References Cited

U.S. PATENT DOCUMENTS

| 5,888,074 A | 3/1999 | Staplin et al. |
| 9,342,993 B1 | 5/2016 | Fields et al. |
(Continued)

FOREIGN PATENT DOCUMENTS

| DE | 102010027242 A1 | 1/2012 |
| DE | 102014013298 A1 | 4/2015 |
| DE | 102013019424 A1 | 5/2015 |

OTHER PUBLICATIONS

German Patent and Trademark Office, Request for Examination for the corresponding German Patent Application No. 10 2017 200 149.6 dated Oct. 30, 2017.

*Primary Examiner* — Kesha Frisby
(74) *Attorney, Agent, or Firm* — Frank MacKenzie; Brooks Kushman P.C.

(57) ABSTRACT

A method and apparatus for teaching and/or evaluating driving behavior of a driver of an autonomous-capable vehicle. The vehicle is operated in a manual-control mode wherein a driver has manual control, and a communication device (audio speaker, visual display, etc.) issues an instruction to the driver to perform a task. As the driver is attempting to perform the task, a sensor monitors the driver's behavior. A driver instruction module (that interfaces with the vehicle's autonomous driving module) determines a deviation between the driver's behavior and a desired behavior to perform the task. If the deviation exceeds a permissible amount, the vehicle is placed under autonomous control (control is taken away from the driver) and the task is completed in a manner that is in accordance with the desired behavior.

17 Claims, 5 Drawing Sheets

(51) Int. Cl.
*G09B 5/04* (2006.01)
*G09B 19/14* (2006.01)
*G05D 1/00* (2006.01)
*B60K 35/00* (2006.01)
*B60W 30/00* (2006.01)
*G02B 27/01* (2006.01)

(52) U.S. Cl.
CPC .............. *G09B 5/02* (2013.01); *G09B 5/04* (2013.01); *G09B 19/14* (2013.01); *B60K 2370/175* (2019.05); *B60K 2370/193* (2019.05); *B60K 2370/334* (2019.05); *B60K 2370/736* (2019.05); *G02B 27/0101* (2013.01); *G02B 2027/014* (2013.01); *G02B 2027/0138* (2013.01); *G02B 2027/0141* (2013.01); *G05D 2201/0213* (2013.01)

(58) Field of Classification Search
USPC .......................................................... 434/65
See application file for complete search history.

(56) References Cited

U.S. PATENT DOCUMENTS

| | | |
|---|---|---|
| 2008/0064014 A1 | 3/2008 | Wojtczak et al. |
| 2010/0209885 A1 | 8/2010 | Chin et al. |

METHOD AND DEVICE FOR EVALUATING DRIVING BEHAVIOR

CROSS-REFERENCE TO RELATED APPLICATIONS

This application claims foreign priority benefits under 35 U.S.C. § 119(a)-(d) to DE Application 10 2017 200 149.6 filed Jan. 9, 2017, which is hereby incorporated by reference in its entirety.

TECHNICAL FIELD

The invention relates to a method and a device for learning and checking driving behavior of a vehicle driver in a vehicle and to a vehicle with such a device.

BACKGROUND

In many countries, for example in Germany, obtaining a driver's license involves high costs. This may be for example between €1500 and €2000 or more. Moreover, the driver training to be completed, in which the learner driver learns to handle the vehicle and gains experience in actual traffic, is time-consuming and requires the guidance of a driving instructor. This driving instructor is often only available at prearranged times and has to be paid, and a certain number of driving lessons have to be taken, usually spread out over several weeks, before a driving test can be taken. It often takes at least two months to prepare for a driving test, assuming that it is passed at the first attempt.

What is more, many vehicle manufacturers are currently focusing on developing autonomous, i.e. self-driving, vehicles. This may lead to a situation in the future where a driver's license is no longer required. However, there will still be people who would like to assume the control of a vehicle, at least in certain situations, so that a corresponding driver's license will nevertheless be required. It is expected that, at least in the immediate future, autonomous-capable vehicles will also maintain the ability to be operated under the control by the driver (manual control).

SUMMARY

According to disclosed embodiments of the invention, a method for learning and checking driving behavior of a vehicle driver in an autonomous-capable vehicle is provided. Further, an autonomous-capable vehicle is equipped with a driving instruction module which augments functionality of an autonomous-capable vehicle to allow safe instruction and checking of driving behavior.

A device that teaches people without a driver's license correct driving behavior (driving instruction mode) is installed in an autonomous-capable vehicle, so that a driving instructor in the form of a person is no longer required. Moreover, such a device may be designed to carry out and monitor a driving test (driving test mode) and, after a driving test has been passed and the driver's license obtained, make recommendations to the vehicle driver (driving advice mode).

According to one embodiment of the disclosed invention, a method for teaching, instructing, or evaluating proper driving performance comprises operating an autonomous-capable vehicle in a manual-control mode wherein a driver has manual control of the vehicle, and operating a communication device (such as, for example, an audio speaker or a visual display) to issue an instruction to the driver to perform a task. As the driver is attempting to perform the task, a sensor is operated to monitor driver behavior. A processing unit of the driver instruction module (that interfaces with the vehicle's autonomous driving module) determines or calculates a deviation between the driver behavior and a desired behavior to perform the task. If the deviation exceeds a permissible amount, the vehicle is placed under autonomous control (control is taken away from the driver) and the task is completed in a manner that is in accordance with the desired behavior.

According to another embodiment of the disclosed invention, an autonomous-capable vehicle comprises a driving instruction module that electronically interfaces/communicates with an autonomous control module of the vehicle. The driving instruction module is operative to issue an instruction to a driver to perform a task, the performance of which is to be evaluated. The vehicle is placed under manual control and the driver is allowed to perform the task while being monitored by the dim and associated sensors from which it receives information. The dim then compares the driver behavior detected with a desired behavior to perform the task, and a deviation between the driver behavior and desired behavior is calculated. The vehicle is placed under autonomous control if the deviation exceeds a permissible amount, and the task is completed under autonomous control.

As explained further below, initially driving behavior patterns for a vehicle driver in various vehicle and/or traffic situations are provided.

A vehicle situation should be understood as meaning a situation concerning the vehicle, such as for example the engine switched on, safety belt unfastened, vehicle driving or stationary, engine speed (RPM) in a certain range, a certain gear has been selected, etc.

A traffic situation is a situation with respect to the surroundings, i.e. for example a single-lane or multi-lane roadway, main highway turns off, traffic merging from the left, parking space on the right, speed limit, another vehicle is in the process of overtaking, etc.

A driving behavior pattern assigned to any such situation or combination of vehicle and traffic situations determines how the vehicle driver should behave in this situation, for example indicate when turning off, fasten seatbelt as soon as the engine is switched on, look over shoulder before changing lane or turning off maneuver, etc.

A vehicle should be understood as meaning any mobile means of transport, i.e. both a land craft and a water or aircraft, for example a passenger car, the vehicle being designed for driving by a human vehicle driver. For example, a passenger car must be equipped with a means of indicating turning, for example a steering wheel, a means of indicating braking, for example a brake pedal, and a means of indicating acceleration, for example a gas pedal. Furthermore, depending on the type of transmission, a clutch pedal may be provided and also a parking brake, rearview mirror, outside mirrors, direction indicator switch, etc.

The vehicle may be formed as an autonomous-capable vehicle. An autonomous-capable vehicle should be understood as meaning a self-driving vehicle that itself can perform all functions that are critical to safety for the entire driving process, so that there is no need for the vehicle driver to check what is happening at any time. The vehicle is able to control all functions from start to finish itself, including all parking functions. An autonomous-capable vehicle is also operable in a manual mode, in which a human vehicle driver controls all or some of the vehicle functions.

Furthermore, a vehicle and/or traffic situation is detected, for example by means of sensors. These may for example be such sensors that are required for autonomous driving of the vehicle. For example, the surrounding traffic may be observed by means of cameras. For determining the distance from obstacles, radar, lidar and/or ultrasound sensors may be provided. For example, these may be sensors that are required in an autonomous vehicle for driving the vehicle by means of a virtual driver.

For further, for example route-dependent, information, such as for example the maximum speed allowed on a section of highway, it is also possible for example to rely on information that is stored in a database. In addition, information concerning the vehicle and/or traffic situation may also be determined externally and transmitted.

In a next step, a desired behavior is inferred from the detected vehicle and/or traffic situation and the driving behavior patterns, for example in that a certain vehicle and/or traffic situation is assigned a driving behavior pattern. That is to say, it is determined how the vehicle driver should ideally behave in the situation detected, for example, depending on the situation, grip the steering wheel with both hands, now park, turn off, accelerate, brake, etc. This inference of the desired behavior may take place for example by means of a processing unit designed for the purpose. It is also possible for a number of desired behaviors to be inferred from a detected vehicle and/or traffic situation and the driving behavior patterns.

Then the actual behavior of the vehicle driver is detected by means of sensors. For example, one or more cameras may record the behavior of the vehicle driver, for example a movement of the head or eyes. It can for example be determined in this way whether the traffic situation is being given sufficient attention. This may for example comprise detecting the general attention to the front, checking looking back when turning, observing traffic in the rearview or outside mirrors or the dead spots by correspondingly looking over the shoulders.

Furthermore, the head position of the vehicle driver can be detected, in order for example to be able to check whether the rearview mirrors are set to the correct angle. In addition, noises may also be detected by means of microphones.

Further sensors may be provided, in order to determine the hand position of the vehicle driver on the steering wheel, for example whether the driver has one or both hands on the steering wheel, in order subsequently to be able if appropriate to infer and issue instructions for correct positioning of the hands. For example, it can be checked whether at least one hand is always in contact with the steering wheel, whether both hands are in contact with the steering wheel, whether, if the vehicle and traffic situation allows, the crossing hands technique is correctly applied when steering or whether the steering wheel is correctly handled when it is being allowed back into the neutral position.

Furthermore, the head position of the vehicle driver, the seat position, the positioning of the safety belt, etc. may be detected. In addition, sensors can be used for example for detecting the speed of the vehicle, its acceleration, the pedal positions, the gear selected, the direction indicator status, the steering wheel angle, etc.

In a next step, the actual behavior is compared with the desired behavior in a computer-aided manner, i.e. a processing unit designed for the purpose checks whether the actual behavior and the desired behavior coincide or deviate from one another. If appropriate, a certain tolerance range may have been or be prescribed, for example it may be provided that the actual speed deviates by no more than 5 km/h from the desired speed. If the actual behavior lies within this tolerance range, it may be classified as not deviating from the desired behavior.

If the comparison of the desired behavior and the actual behavior finds that the two deviate from one another, instructions are inferred and issued in order to bring the actual behavior in line with the desired behavior.

If no deviation between the actual behavior and the desired behavior is found, the above steps are repeated. It is normally possible to dispense with providing the driving behavior patterns, since they are provided once or at certain intervals independently of the actual behavior or desired behavior, for example by means of a database.

The method described may for example be carried out within the vehicle. There is also the possibility that only the detection of the actual behavior of the vehicle driver, or also the detection of the vehicle and/or traffic situation, takes place on or in the vehicle, while the further method steps are performed externally, in that the required data are transmitted, for example to a central processing and storing unit.

The method according to the invention may be used for example to teach a vehicle driver how to drive (so-called driving instruction mode), it being possible to take as many lessons as desired or else for charging to be based on a pay-per-use model. Both the vehicle driver and the traffic situation are observed and instructions what to do can be given (for example turn off to the left, accelerate, park behind the red car, look over the shoulder through the rear window when reversing) or where to drive.

After passing the driving test, the method according to the invention can continue to be used, in order to check and improve the driving of a vehicle (so-called driving advice mode), for example if an autonomous vehicle is in a manual, i.e. not autonomous, mode. A reward system may be used, for example in the form of points to be collected, in order to motivate the vehicle driver (gamification). In uncritical situations, acoustic signals, for example by means of voice output, may be used in order to draw the attention of the vehicle driver to a deviation of the actual behavior from the desired behavior.

The method according to the invention may serve in addition for optimizing the gear changing behavior of the vehicle driver. For example, the gear changing behavior may be analyzed, as required in some countries for passing the driving test.

According to various design variants, the instructions, for example in the form of instructions for action, may be issued to the vehicle and/or to the vehicle driver; if they are issued to the vehicle, the latter being controlled autonomously according to the instructions. This may correspond to the behavior of a human driving instructor in dangerous situations.

The decision as to whether the instructions are issued to the vehicle and/or the vehicle driver may be taken by means of a decision algorithm. For example, it may be provided that, in the case of deviations that are not critical to safety, i.e. deviations that do not lead directly to a disadvantage for the vehicle driver or other road users, for example in the form of an accident, they are issued to the vehicle driver, so that the driver can alter his or her actual behavior correspondingly. If, on the other hand, the deviation is critical to safety, i.e. if for example an accident is likely, they are preferably issued to the vehicle.

Alternatively, it may be provided that, irrespective of the type and magnitude of the deviation, the instructions are always issued to the vehicle, always issued to the vehicle driver or always issued to both.

According to various design variants, it may be provided that the desired behavior is issued to the vehicle driver. For example, the vehicle driver may obtain instructions what to do that are adapted to the vehicle and/or traffic situation, such as for example turn off to the right, park on the left, overtake, etc. The vehicle driver consequently has the possibility of learning and practicing certain maneuvers, as they would otherwise be prescribed for example by a human driving instructor.

According to various design variants, the method may also comprise a demonstration of a desired behavior by the vehicle, for example of the desired behavior assigned to the detected vehicle and/or traffic situation. There is consequently the possibility that the vehicle demonstrates to the vehicle driver how certain driving maneuvers should be performed, for example, overtaking, parking parallel or perpendicularly to the roadway, etc., or how to react in certain vehicle and/or traffic situations. The vehicle driver may subsequently repeat, and consequently learn, the driving maneuver that is demonstrated.

According to various design variants, the instructions and/or the desired behavior may be issued acoustically and/or visually, for example by a corresponding announcement over audio speakers or indication by means of displays, and/or by means of haptic vibration. For example, the steering wheel may vibrate in order to haptically indicate that increased attention is required or that both hands should be in contact with the steering wheel. A vibrating gas pedal may for example haptically indicate that it should be actuated in order to accelerate the vehicle.

According to further design variants, the method may also comprise recording of the actual behavior, for example in the form of video and/or sound recordings. For example, video and/or sound recordings may be recorded by means of cameras that observe the surroundings of the vehicle and/or the behavior of the vehicle driver, it also being possible for a number of cameras to be provided for recording a behavior from a number of perspectives. Such recordings may also be used to generate, for example calculate, a bird's eye view, in which a certain situation can often be illustrated clearly.

The video and/or sound recordings may be shown to the vehicle driver, or if appropriate also to other persons, at a later time, in order to draw attention to mistakes and give suggestions for improvements.

According to various design variants, the method may comprise determining and issuing a number and/or type of issued instructions within a time interval. The issuing may comprise transferring to an external server unit, for example a driver licensing agency.

The number and/or type of issued instructions within a time interval may be evaluated statistically, in order to obtain findings about the driving ability of a vehicle driver. For example, a driving test may be carried out and monitored.

For this purpose, it may be provided that the number and/or type of issued instructions within a certain time interval is/are transferred or transmitted, for example to an authority that decides on the passing of a driving test and the issuing of the driver's license. The transfer or transmission may also take place automatically. If the number and/or type of issued instructions within a certain time interval satisfies defined criteria, i.e. the driving test is passed, a driver's license may also be issued immediately, for example electronically.

According to various design variants, the method may also comprise determining the identity of the vehicle driver. It can in this way be ensured for example that only authorized persons drive a vehicle or that the correct person is taking a driving test.

A device according to the invention for learning and checking driving behavior of a vehicle driver, also referred to as the driving instruction module, has the features described below. For the explanation of certain terms and for further details, reference is made to the statements made above concerning the method. The device according to the invention may for example be designed for carrying out the method according to the invention.

The device according to the invention has a storing unit for storing driving behavior patterns for a vehicle driver in various vehicle and/or traffic situations. Also provided are sensors for detecting a vehicle and/or traffic situation and sensors for detecting an actual behavior of the vehicle driver.

Furthermore, the device has a processing unit, which is designed for inferring a desired behavior for the vehicle driver from the driving behavior patterns and the detected current vehicle and/or traffic situation, for comparing the actual behavior with the desired behavior and for inferring instructions if the actual behavior deviates from the desired behavior. One or more communication devices for issuing the instructions to the driver are also provided.

According to various design variants, the sensors may be formed as image sensors, so that for example photo or video recordings can be recorded.

According to further design variants, the communication device may be formed as audio speakers and/or displays, for example as a head-up display, i.e. as an indicating system in which the user can maintain his or her head position or viewing direction because the information is projected into his or her field of view.

Alternatively or additionally, vibration systems may be provided, such as for example a vibrating steering wheel or vibrating gas pedal, in order to issue haptic instructions to the vehicle driver.

In addition, it may also be provided that the vehicle driver communicates with the device according to the invention by means of microphones, switches and/or touchscreens.

According to various design variants, the device may have a storing unit for recording the actual behavior.

Furthermore, a transmission device may be provided for transmitting data to an external server unit, for example in order to transmit a number and/or type of issued instructions within a time interval to a driver licensing agency as described above.

In addition, the device may have an identifying device for identifying the vehicle driver, for example in the form of a fingerprint scanner or a device for checking the ID card or passport.

A vehicle according to the invention has a device according to the invention.

In addition, such a vehicle may have a control device, which is designed for autonomously controlling the vehicle according to the instructions issued. The vehicle may therefore be an autonomous vehicle, which as described above is however equipped in such a way that it can also be driven by a human vehicle driver.

A computer program product according to the invention comprises instructions that cause a device according to the invention to perform a method according to the invention.

A computer program product according to the invention is stored on a computer-readable medium according to the invention.

The solution according to the invention has the following advantages:

A human driving instructor is no longer required, so that costs can be reduced.

A high quality of the driving instruction is ensured, since, by contrast with a human driving instructor, the device described does not become tired or impatient during a lesson. The use of cameras and other sensors also allows the driving instruction to be recorded and the learner driver can use these recordings to prepare for subsequent lessons.

The invention is available round-the-clock, i.e. also on weekends and holidays. This increases the flexibility and reduces the time that it takes to get a driver's license. Learner drivers can practice for as long as they like.

The invention is also available after passing the driving test, if it is desired by the vehicle driver or for example the parents of the driver. Consequently, the vehicle drivers are not left alone in traffic, as would be the case with human driving instructors. This can assist the vehicle driver in building up self-confidence.

The invention is to be explained in more detail below on the basis of exemplary embodiments. In the associated drawings:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the examples explained below, reference is made to the appended drawings, which form part of these examples and in which specific embodiments in which the invention can be performed are shown for purposes of illustration.

Other embodiments can be used and structural or logical modifications can be made without departing from the protective scope of the present invention. The features of the various embodiments given by way of example and described herein can be combined with one another, unless specifically indicated otherwise. The following description is therefore not to be understood in a restrictive sense, and the scope of protection of the present invention is defined by the appended claims.

Figure 1:
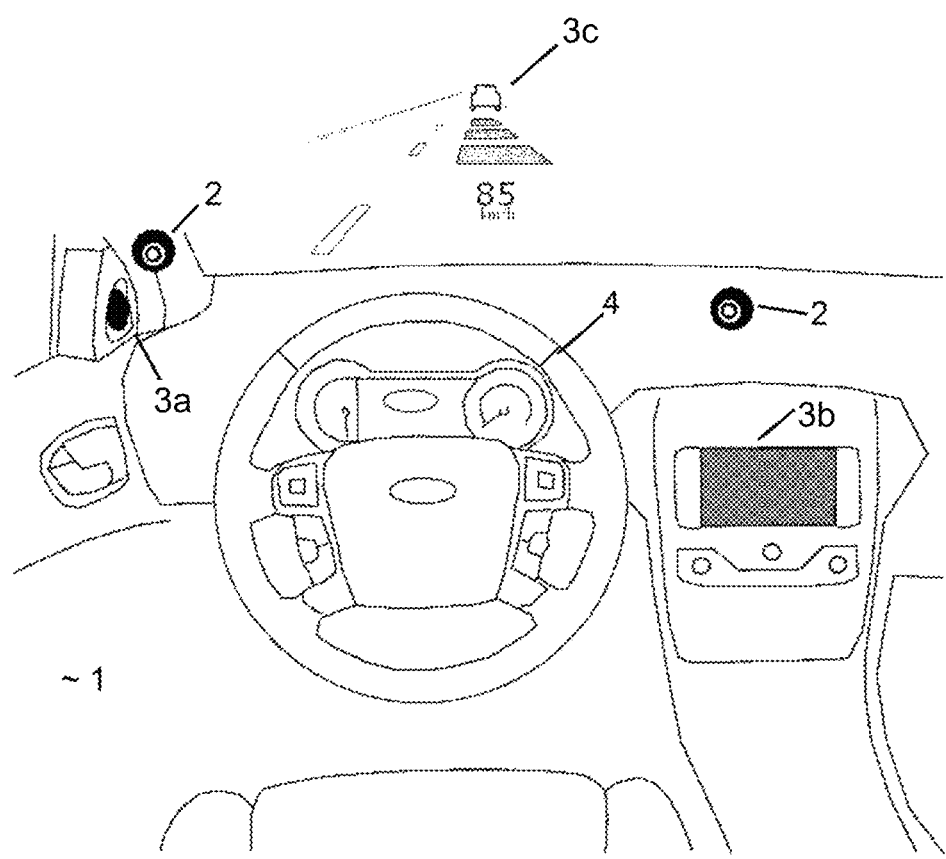
FIG. 1 shows a schematic representation of a vehicle according to the invention.

In one exemplary embodiment (FIG. 1), the vehicle 1 is a passenger car, which is equipped with a device according to the invention, i.e. a driving instruction module. The vehicle 1 is suitable in principle for autonomous driving, but can also be controlled manually by a vehicle driver.

The driving instruction module of the vehicle 1 has a storing unit, on which driving behavior patterns for various vehicle and/or traffic situations have been stored in advance, for example by the vehicle manufacturer.

Figure 2:
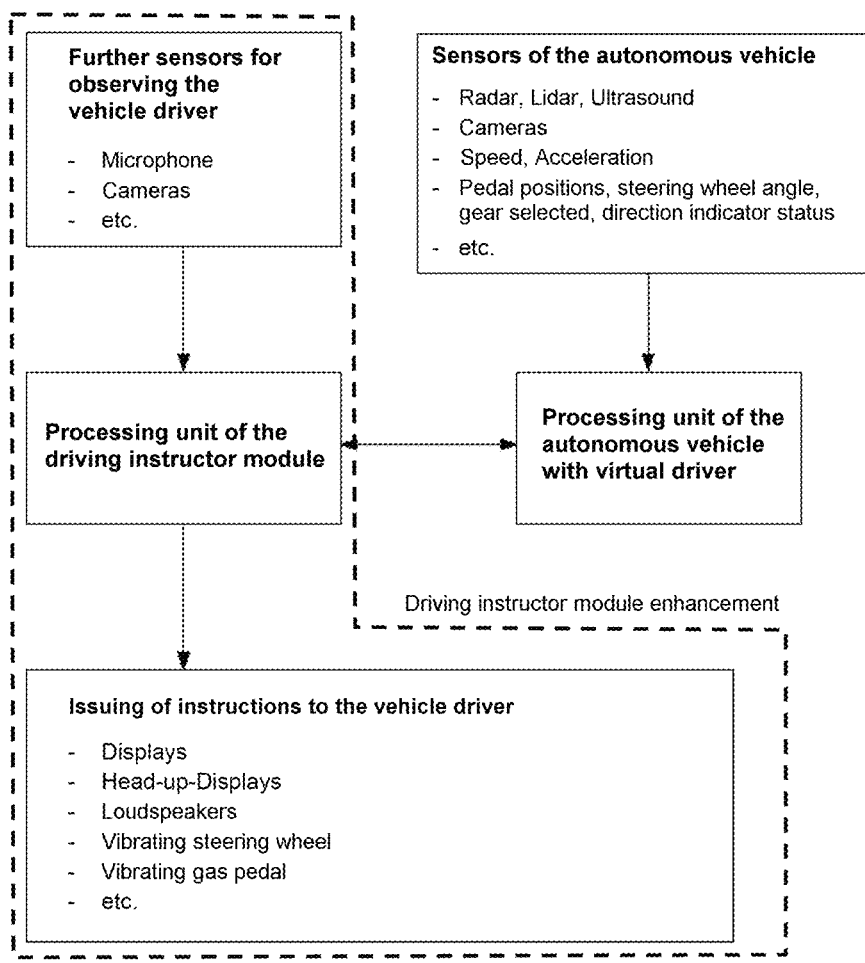
FIG. 2 shows a schematic representation of the interaction of features of the device according to the invention in the vehicle according to the invention.

In addition, the vehicle 1 has sensors (as indicated in FIG. 2) for detecting the vehicle and traffic situation. For example, it is detected whether the engine is switched on, how many lanes the route being taken has and what obstacles there are in the area surrounding the vehicle. Provided inter alia for this purpose are cameras 2 as image sensors. The situation and the stored driving behavior patterns are then used to infer a number of desired behaviors, i.e. a behavior as to how the vehicle driver should ideally behave in this situation. This may for example be a maximum speed, which results from the presence of obstacles.

Further sensors 2, in the example likewise formed inter alia as cameras 2, are provided for detecting or monitoring physical movements/behaviors of the vehicle driver, i.e. the vehicle driver is observed. It is for example detected whether the vehicle driver has at least one hand on the steering wheel 4 at all times and is directing his or her view at the traffic situation. It may additionally checked whether the safety belt (not shown) is properly fastened.

By means of a processing unit of the vehicle 1, the actual behavior is compared with the desired behavior in a computer-aided manner. If it is found, for example, that the engine is switched on and the safety belt is fastened, the actual behavior does not deviate from the relevant desired behavior and a new traffic and/or vehicle situation is detected.

If, however, the actual behavior deviates from the desired behavior, for example in that the actual speed is greater than the desired speed appropriate for the situation, corresponding corrective instructions are inferred and issued.

In the case of a minor deviation of the speed, of for example a maximum of 10%, the corrective instructions are issued to the vehicle driver by means of audio speakers 3a as an audible instruction, so that the vehicle driver himself or herself can adapt his or her actual behavior to the desired behavior.

If, on the other hand, the deviation is too great, i.e. the speed is for example 20% greater than the desired speed, the processor returns the vehicle to autonomous operation so that the corrective instructions are issued directly to the vehicle 1, which correspondingly reduces the speed automatically, i.e. autonomously, since in this case a reaction of the vehicle driver may be likely to take too much time and a dangerous situation could arise.

FIG. 2 shows the interaction of an autonomous vehicle 1 known from the prior art with the driving instruction module according to the invention.

The vehicle 1 is equipped with a number of sensors, which make autonomous driving possible, for example radar, lidar and ultrasound sensors, cameras, speed and acceleration sensors and sensors which check the pedal position, the steering wheel angle, the gear selected, the direction indicator status, etc. These sensors may be used for detecting a vehicle and/or traffic situation. The data determined by these sensors are processed by a processing unit of the autonomous vehicle, so that the vehicle is driven by a virtual driver.

A driving instruction module enhancement enhances the autonomous vehicle by adding further sensors 2, which observe the behavior of the vehicle driver (actual behavior). Such sensors may be for example microphones or image sensors in cameras.

The processing unit of the autonomous vehicle is likewise enhanced and is then capable of inferring from the detected vehicle and/or traffic situation and the driving behavior patterns one or more desired behaviors, comparing the actual behavior with the desired behavior and, in the case of the actual behavior deviating from the desired behavior, inferring and issuing corresponding corrective instructions for modifying the actual behavior.

These corrective instructions may for example be issued to the vehicle driver by means of displays 3b, head-up displays 3c, audio speakers 3a, a vibrating steering wheel 4 or a vibrating gas pedal (not shown).

Figure 3A:
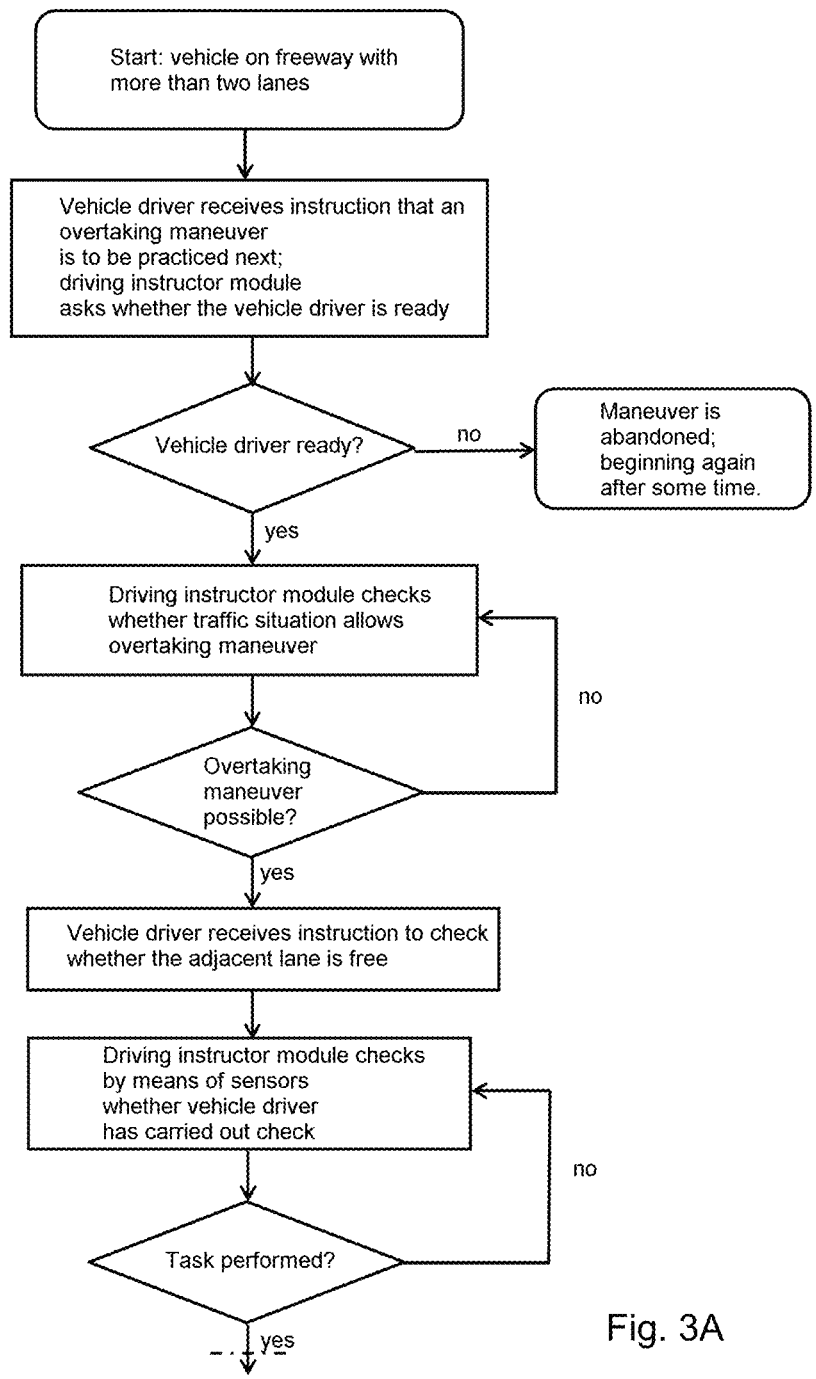
FIG. 3A shows a first portion (portion 1 of 3) of a flow diagram of an overtaking maneuver according to the method according to the invention.
Figure 3B:
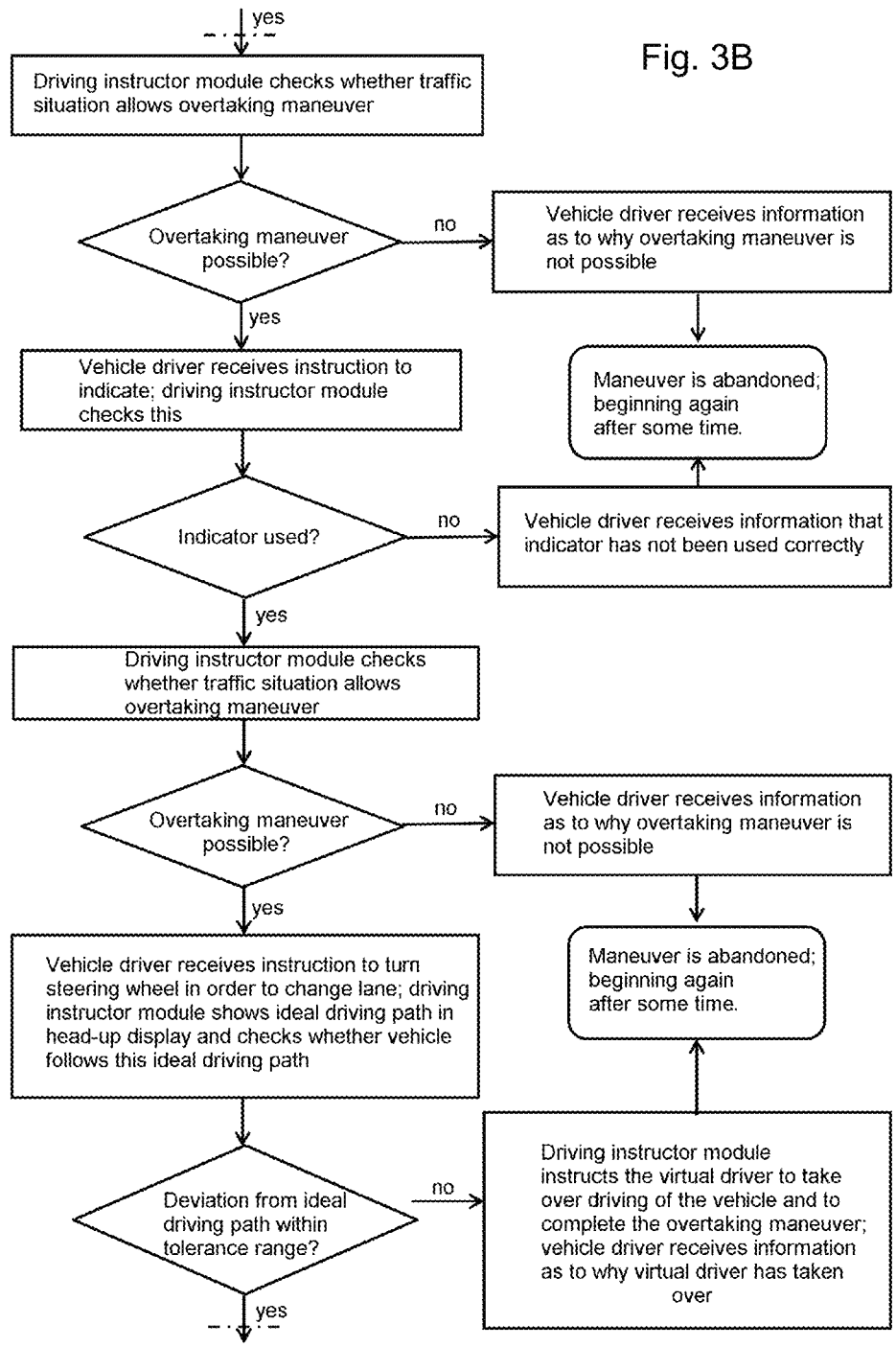
FIG. 3B shows a continuation (portion 2 or 3) of the flow diagram of FIG. 3A.
Figure 3C:
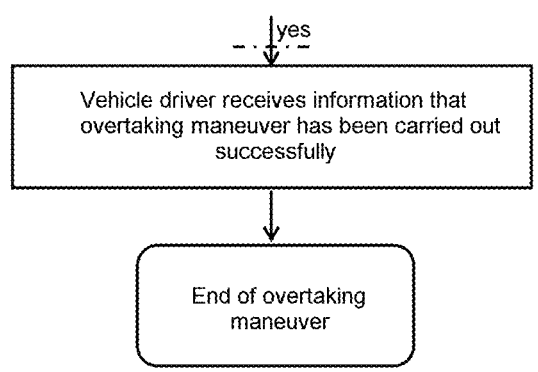
FIG. 3C shows a continuation (portion 3 or 3) of the flow diagram of FIGS. 3A and 3B.

FIGS. 3A-C show a flow diagram of an overtaking maneuver, which is carried out by means of a method according to the invention in a vehicle 1 with a driving instruction module that is suitable for autonomous driving and has a storing unit, in which driving behavior patterns for a vehicle driver in various vehicle and/or traffic situations are stored.

At the beginning, the vehicle 1 is on a freeway with more than two lanes. This traffic situation has been detected by means of sensors. An overtaking maneuver has been inferred as the task to be practiced, which tasking is issued to the vehicle driver, i.e. the vehicle driver receives the instruction that an overtaking maneuver is to be practiced. If the vehicle driver is not ready for this, the driving instruction module abandons the process and begins again after some time.

If the vehicle driver is ready, the driving instruction module checks by means of sensors whether the traffic situation allows an overtaking maneuver. This check is continued until an overtaking maneuver is possible.

If this is the case, the vehicle driver receives instructions to check whether the adjacent lane is free, in that the driver looks in the rearview mirrors and checks the dead spot by looking over his or her shoulder. The driving instruction module detects this actual behavior by means of cameras as sensors 2 and checks whether the vehicle driver has checked the adjacent lane.

Once this task has been performed, the driving instruction module checks once again whether the traffic situation allows an overtaking maneuver. If this is not the case, the vehicle driver receives information as to why the overtaking maneuver is not possible. The maneuver is abandoned and carried out once again at a later time.

If the overtaking maneuver is possible, the vehicle driver receives the instruction to indicate, i.e. use the direction indicator. This actual behavior is likewise checked by the driving instruction module by means of sensors. If the indicator has not been used correctly, i.e. the actual behavior deviates from the desired behavior, the vehicle driver receives corresponding information as a corrective instruction and the maneuver is abandoned.

If the indicator has been used correctly, the driving instruction module checks once again whether the traffic situation allows an overtaking maneuver. If this is not the case, the vehicle driver receives information as to why the overtaking maneuver is not possible. The maneuver is abandoned and carried out once again at a later time.

If the overtaking maneuver is possible, the vehicle driver receives the instruction to turn the steering wheel 4 in order to change lane. The driving instruction module shows the ideal driving path, i.e. the desired behavior, in a head-up display 3c as communication device and checks whether the vehicle 1 follows this ideal driving path.

If the comparison of the actual behavior and the desired behavior finds that the deviation from the ideal driving path lies outside a tolerance range, the driving instruction module instructs the virtual driver to take over driving of the vehicle and to complete the overtaking maneuver. The vehicle driver receives corresponding information as to why the virtual driver has taken over. The overall process is abandoned and carried out once again at a later time.

If the deviation from the ideal driving path lies within the tolerance range, the vehicle driver receives the information that the overtaking maneuver has been carried out successfully, the maneuver is completed and a new vehicle and/or traffic situation can be detected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    operating an autonomous-capable vehicle under autonomous control to demonstrate performance of a task in accordance with a desired behavior to perform the task;
    operating a sensor to monitor driver behavior as the driver performs the task in a manual-control mode;
    operating a processing unit to determine a deviation between the driver behavior and the desired behavior; and if the deviation exceeds a permissible amount, operating the vehicle under autonomous control to complete the task in accordance with the desired behavior.

2. The method of claim 1, wherein communication device comprises an audio speaker operable to deliver an audible instruction.

3. The method of claim 1, further comprising communicating the desired behavior to the driver.

4. The method of claim 3, wherein communicating the desired behavior comprises displaying an ideal driving path on a visual display viewable by the driver.

5. The method of claim 4, wherein the visual display is a head-up display.

6. The method of claim 1, wherein operating a sensor to monitor the driver behavior comprises operating a camera to detect a physical action by the driver.

7. A method of operating an autonomous-capable vehicle comprising:
    instructing a driver to perform a task;
    operating the vehicle autonomously to demonstrate performance of the task in accordance with a desired behavior to perform the task;
    operating a sensor to monitor driver behavior as the driver performs the task under manual vehicle control;
    operating a processor to determine a deviation between the driver behavior and the desired behavior; and
    operating the vehicle autonomously to complete the task if the deviation exceeds a permissible amount.

8. The method of claim 7, further comprising communicating the desired behavior to the driver.

9. The method of claim 8, wherein communicating the desired behavior comprises displaying an ideal driving path on a visual display viewable by the driver.

10. The method of claim 9, wherein the visual display is a head-up display.

11. The method of claim 7, wherein operating a sensor to monitor the driver behavior comprises operating a camera to detect a physical action by the driver.

12. An autonomous-capable vehicle comprising a driving instruction module operative to demonstrate performance of a task under autonomous vehicle control and in accordance with a desired behavior, issue an instruction to a driver to perform the task, put the vehicle under manual control as the driver performs the task, monitor driver behavior during task performance; determine a deviation between the driver behavior and a desired behavior to perform the task, put the vehicle under autonomous control if the deviation exceeds a permissible amount, and complete the task under autonomous control.

13. The vehicle of claim 12, further comprising an audio speaker operable to deliver the instruction to the driver as an audible instruction.

14. The vehicle of claim 12, wherein the driving instruction module is further operative to communicate the desired behavior to the driver.

15. The vehicle of claim 14, further comprising a visual display viewable by the driver and operative to communicate the desired behavior by depicting an ideal driving path.

16. The vehicle of claim 15, wherein the visual display is a head-up display.

17. The vehicle of claim 12, further comprising a camera operative to detect a physical action by the driver.

* * * * *